United States Patent
Cheng et al.

(10) Patent No.: US 8,001,426 B2
(45) Date of Patent: Aug. 16, 2011

(54) ELECTRONIC MALFUNCTION DIAGNOSTIC APPARATUS AND METHOD

(75) Inventors: Hua-Dong Cheng, Shenzhen (CN); Han-Che Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 211 days.

(21) Appl. No.: 12/429,144

(22) Filed: Apr. 23, 2009

(65) Prior Publication Data

US 2010/0064175 A1    Mar. 11, 2010

(30) Foreign Application Priority Data

Sep. 11, 2008    (CN) .......................... 2008 1 0304462

(51) Int. Cl.
*G06F 11/00*    (2006.01)
(52) U.S. Cl. ................. 714/44; 714/25; 714/40; 714/46
(58) Field of Classification Search .................. 714/25, 714/40, 44, 46
See application file for complete search history.

(56) References Cited

U.S. PATENT DOCUMENTS

| | | | |
|---|---|---|---|
| 4,823,343 A * | 4/1989 | Takahashi | 714/46 |
| 6,357,017 B1 * | 3/2002 | Bereiter et al. | 714/27 |
| 6,480,972 B1 * | 11/2002 | Cromer et al. | 714/25 |
| 6,516,427 B1 * | 2/2003 | Keyes et al. | 714/25 |
| 6,782,495 B2 * | 8/2004 | Bernklau-Halvor | 714/44 |
| 6,868,507 B1 * | 3/2005 | Gurumoorthy et al. | 714/25 |
| 6,944,793 B1 * | 9/2005 | Parker | 714/25 |
| 7,013,410 B2 * | 3/2006 | Asauchi | 714/46 |
| 7,260,597 B1 * | 8/2007 | Hofrichter et al. | 709/200 |
| 7,334,166 B1 * | 2/2008 | Rhea et al. | 714/46 |
| 7,350,115 B2 * | 3/2008 | Mathew et al. | 714/46 |
| 7,398,428 B2 * | 7/2008 | Hille | 714/44 |
| 7,613,802 B2 * | 11/2009 | Motoyama et al. | 709/224 |
| 7,647,527 B2 * | 1/2010 | Duan et al. | 714/25 |
| 2005/0033834 A1 * | 2/2005 | Nutt | 709/223 |
| 2005/0066231 A1 * | 3/2005 | Szucs et al. | 714/25 |
| 2005/0228560 A1 * | 10/2005 | Doherty et al. | 701/33 |
| 2006/0150031 A1 * | 7/2006 | Asauchi | 714/46 |
| 2006/0230312 A1 * | 10/2006 | Nichols et al. | 714/25 |
| 2007/0294090 A1 * | 12/2007 | Thieret et al. | 705/1 |
| 2008/0109683 A1 * | 5/2008 | Erwin et al. | 714/46 |
| 2008/0263398 A1 * | 10/2008 | Mori et al. | 714/25 |

* cited by examiner

*Primary Examiner* — Robert Beausoliel, Jr.
*Assistant Examiner* — Joshua P Lottich
(74) *Attorney, Agent, or Firm* — Altis Law Group, Inc.

(57) ABSTRACT

A method for automatically diagnosing malfunction in device is provided. The method includes: acquiring a sort identification code from a hardware code of the malfunctioning device connected to the diagnostic apparatus; determining the access address of the diagnostic program on the server according to the determined sort identification code in a diagnostic program access address table; accessing the diagnostic program from the server according to the determined access address of the diagnostic program; applying the diagnostic program to the malfunctioning device to generate a diagnosis; and generating a diagnostic report of the generated diagnosis.

7 Claims, 3 Drawing Sheets

ELECTRONIC MALFUNCTION DIAGNOSTIC APPARATUS AND METHOD

BACKGROUND

1. Technical Field

The present disclosure relates to a diagnostic apparatus and method for automatically diagnosing malfunctions in devices.

2. Description of Related Art

Generally, when an electronic apparatus, such as a phone, a camera, or a MP3 player, is broken, the user must send the electronic apparatus to the after-sales service center for repair. Because there are large numbers of electronic apparatus needing repair at any given time, user may need to wait a long time to get their apparatus back. However, for some simple malfunctions, users could perform a home repair if they could diagnose the problem. However because a general user usually does not have the needed knowledge, he or she has no choice but to get the after-sales service from others.

BRIEF DESCRIPTION OF THE DRAWINGS

The components of the drawings are not necessarily drawn to scale, the emphasis instead being placed upon clearly illustrating the principles of the diagnostic apparatus. Moreover, in the drawings, like reference numerals designate corresponding parts throughout several views.

DETAILED DESCRIPTION

Figure 1:
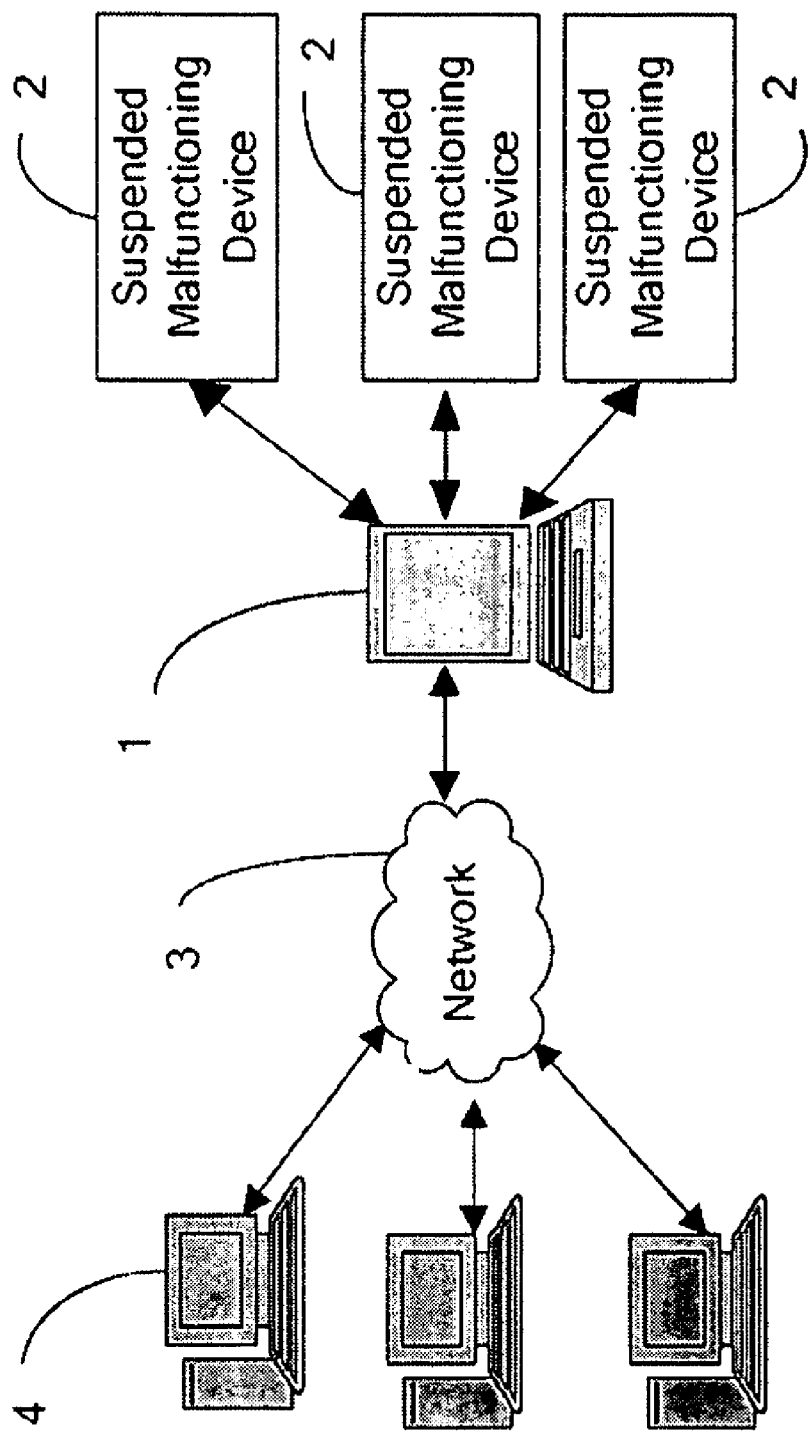
FIG. 1 is a schematic diagram of a diagnostic system for diagnosing malfunctions in devices in accordance with an exemplary embodiment.

FIG. 1 is a schematic diagram of a diagnostic system for diagnosing malfunctions in devices in accordance with an exemplary embodiment. The device diagnostic system (hereafter "the system") includes a diagnostic apparatus 1, at least one suspected malfunctioning device 2 (hereafter "the device"), a network 3, and at least one server 4. The device 2 is assigned with a sort identification code for representing a sort of the device 2. In general, each device 2 is set with an exclusive hardware code by the manufacturer before shipping. The hardware code includes, but is not limited to, a manufacture code, a type code, and a serial number. Accordingly, in the exemplary embodiment, the sort identification code can be a part of the hardware code, such as the manufacture code, the type code, or a combination of the manufacture code or the type code with the serial number.

The device 2 is connected to the diagnostic apparatus 1 through a communication interface (not shown). The diagnostic apparatus 1 obtains a corresponding diagnostic program from the server 4 through the network 3 to diagnose the device 2. The network 3 can be, for example, the Internet, an intranet, a wireless network, or local area network (LAN).

Figure 2:
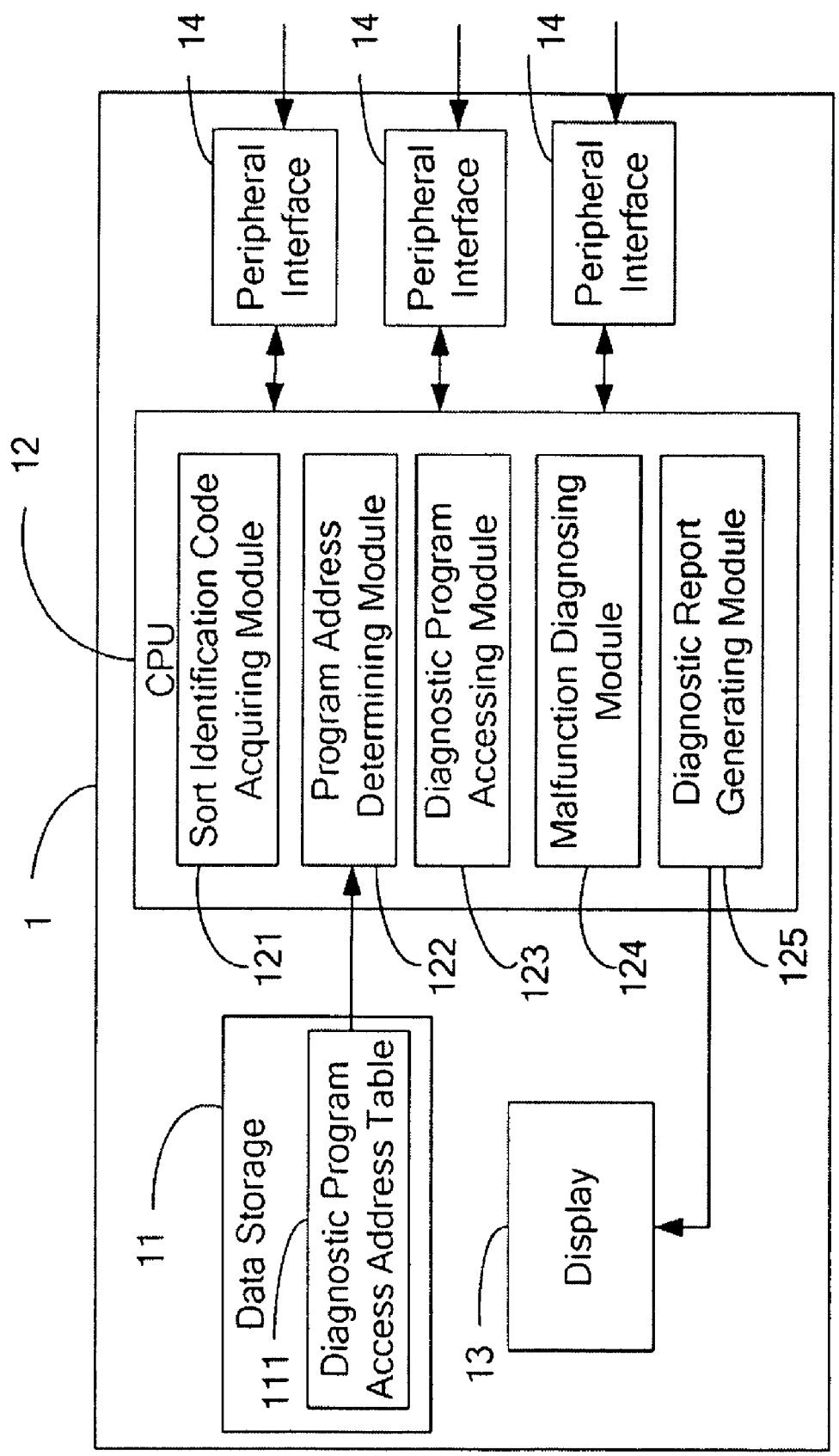
FIG. 2 is a block diagram of a diagnostic apparatus in the diagnostic system of FIG. 1, in accordance with an exemplary embodiment.

FIG. 2 is a block diagram of the diagnostic apparatus 1 in accordance with an exemplary embodiment. The diagnosed apparatus 1 includes a data storage 11, a central processing unit (CPU) 12, a display 13, and at least one peripheral interface 14. The data storage 11 stores a diagnostic program access address table 111. The diagnostic program access address table 111 associates access addresses of the diagnostic programs with various sorts of the at least one device 2 stored on the server 4 according to the sort identification codes.

The CPU 12 includes a sort identification code acquiring module 121, a program address determining module 122, a diagnostic program accessing module 123, a malfunction diagnosing module 124, and a diagnostic report generating module 125. The sort identification code acquiring module 121 is for acquiring the hardware code of the device 2 that is connected to the diagnostic apparatus 1 through the interface 14, and further acquiring the sort identification code from the hardware code. The program address determining module 122 is for determining the access address of the diagnostic program on one of the at least one server 4 according to the determined sort identification code in the diagnostic program access address table 111. The diagnostic program accessing module 123 accesses the diagnostic program from the server 4 according to the determined access address of the diagnostic program. The malfunction diagnosing module 124 applies the diagnosis program to the device 2. The diagnostic report generating module 125 is for generating a diagnostic report of the diagnosis and displaying the diagnostic report on the display 13. The generated diagnostic report can be stored in a predetermined place in the server 4 for access by the manufacturer, and a message can be generated by the server 4 to alert the manufacturer.

In another embodiment, the server 4 also stores a malfunction solution table. The malfunction solution table may hold solutions to common malfunctions. When the malfunction of the device 2 is diagnosed, the malfunction diagnosing module 124 determines whether a solution to the diagnosed malfunction exists in the malfunction solution table. If the solution exists in the malfunction solution table, the malfunction diagnosing module 124 displays the solution for the user.

Figure 3:
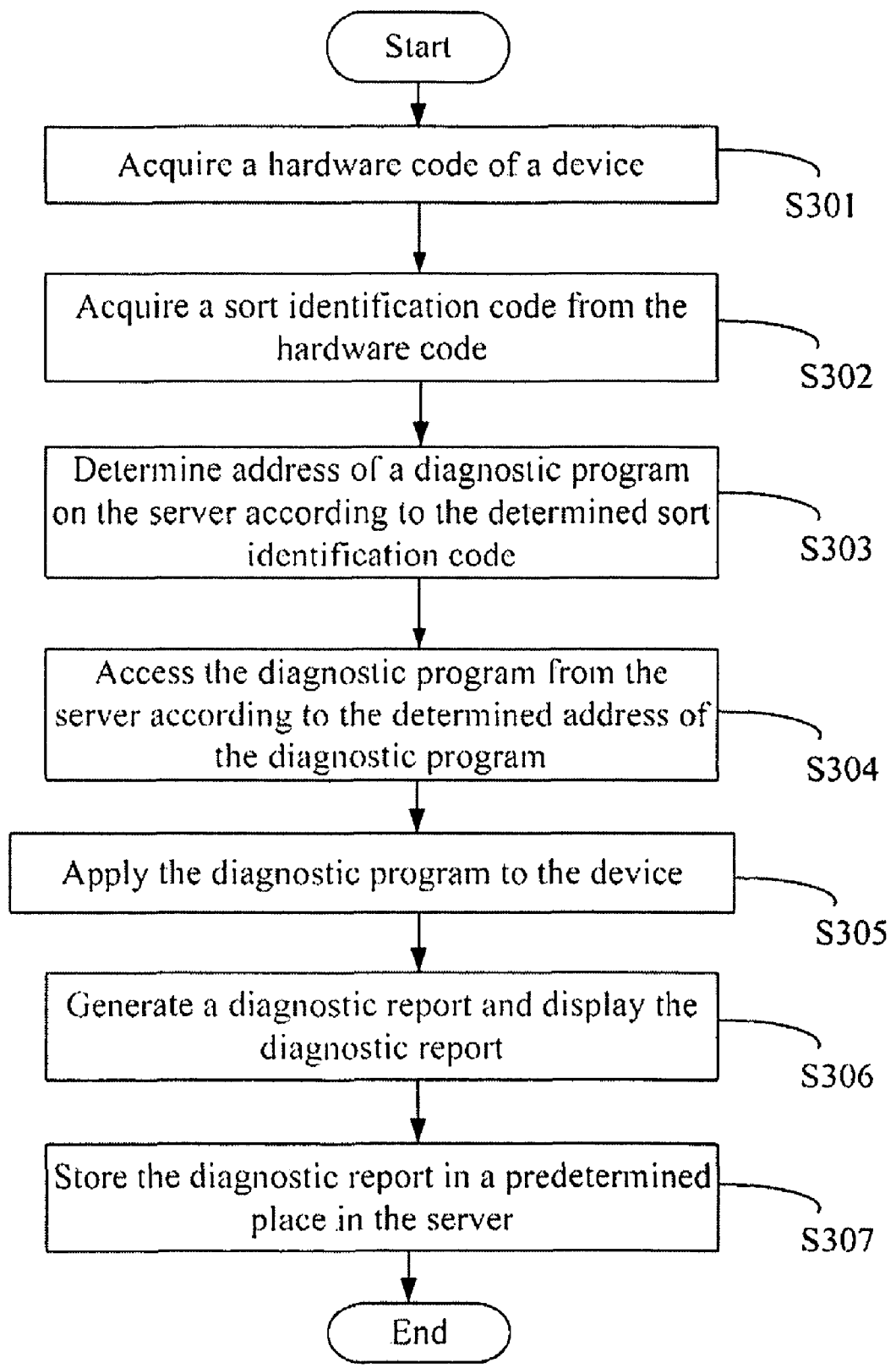
FIG. 3 is a flowchart of a method for diagnosing malfunctions in devices implemented by the diagnostic apparatus of FIG. 2, in accordance with an exemplary embodiment.

FIG. 3 is a flowchart of a method for diagnosing the malfunction in device. In step S301, the sort identification code acquiring module 121 acquires the hardware code of the device 2 that is connected to the diagnostic apparatus 1 through one interface 14.

In step S302, the sort identification code acquiring module 121 acquires the sort identification code from the hardware code.

In step S303, the program address determining module 122 determines the access address of the diagnostic program on the server 4 according to the determined sort identification code in the diagnostic program access address table 111.

In step S304, the diagnostic program accessing module 123 accesses the diagnostic program from the server 4 according to the determined access address of the diagnostic program.

In step S305, the malfunction diagnosing module 124 applies the diagnostic program to the device 2.

In step S306, the diagnostic report generating module 125 generates a diagnostic report of the diagnosis and displays the diagnostic report on the display 13.

In step S307, the diagnostic report generating module 125 stores the diagnostic report in a predetermined place in the server 14.

In another exemplary embodiment, when the malfunction of the device 2 is diagnosed in step 305, the malfunction diagnosing module 124 further determines whether a solution to the diagnosed malfunction exists in the malfunction solution table. If the solution exists in the malfunction solution table, the malfunction diagnosing module 124 displays the solution for the user.

Although the present invention has been specifically described on the basis of preferred embodiments, the invention is not to be construed as being limited thereto. Various changes or modifications may be made to the embodiment without departing from the scope and spirit of the invention.

What is claimed is:

1. A diagnostic apparatus for automatically diagnosing malfunctions in devices, the diagnostic apparatus being connected with at least one server through a network, the diagnostic apparatus comprising:
   at least one peripheral interface for connecting to at least one suspended malfunctioning device;
   a data storage for storing a diagnostic program access address table, wherein the diagnostic program access address table associates access addresses of diagnostic programs stored on one of the at least one server with various sorts of the at least one suspended malfunctioning device according to sort identification codes;
   a sort identification code acquiring module for acquiring the sort identification code from a hardware code of one of the at least one suspended malfunctioning device connected to the diagnostic apparatus;
   a program address determining module for determining the access address of the diagnostic program on the server according to the determined sort identification code in the diagnostic program access address table;
   a diagnostic program accessing module for accessing the diagnostic program from the server according to the determined access address of the diagnostic program;
   a malfunction diagnosing module for applying the diagnostic program to the suspended malfunctioning device; and
   a diagnostic report generating module for generating a diagnostic report of diagnosis generated from the malfunction diagnosing module.

2. The diagnosing apparatus as described in claim 1, wherein the hardware code includes a manufacture code, a type code, and a serial number, and the sort identification code is selected from the group consisting of a part of the hardware code, a combination of the manufacture code with the serial number, and a combination of the type code with the serial number.

3. The diagnosing apparatus as described in claim 1, wherein the diagnostic report is stored to a predetermined place in the server.

4. The apparatus as described in claim 1, further comprising a malfunction solution table stored in the at least one server and holding solutions to common malfunctions of the at least one malfunctioning devices, wherein when the malfunction of the at least one malfunctioning device is diagnosed, the malfunction diagnosing module determines whether a solution to the diagnosed malfunction exist in the malfunction solution table, if the solution exists in the malfunction solution table, the malfunction diagnosing module displays the solution for the user.

5. A method for automatically diagnosing malfunction in a malfunctioning device, comprising:
   providing a data storage for storing a diagnostic program access address table, wherein the diagnostic program access address table associates access addresses of diagnostic programs stored on a server with the malfunctioning device according to a sort identification code of the malfunctioning device;
   acquiring the sort identification code from a hardware code of the malfunctioning device connected to the diagnostic apparatus
   determining the access address of the diagnostic program on the server according to the determined sort identification code in the diagnostic program access address table;
   accessing the diagnostic program from the server according to the determined access address of the diagnostic program;
   applying the diagnostic program to the malfunctioning device to generate a diagnosis; and
   generating a diagnostic report of the generated diagnosis.

6. The method as described in claim 5, further comprising storing the diagnostic report to a predetermined place in the corresponding server of the device.

7. The method as described in claim 5, further comprising:
   providing a malfunction solution table holding solutions to common malfunctions of the malfunctioning device;
   determining whether a solution of the diagnosed malfunction exists in the malfunction solution table;
   displaying the solution of the diagnosed malfunction for the user if the solution exists in the malfunction solution table.

* * * * *